(12) United States Patent
Portnoff

(10) Patent No.: US 6,473,953 B1
(45) Date of Patent: Nov. 5, 2002

(54) WIRE GRIPPER AND METHOD OF INSTALLING DECORATIVE WIRE STRINGS

(76) Inventor: Raymond N. Portnoff, 1 Granville, Ladera Ranch, CA (US) 92694

( * ) Notice: Subject to any disclaimer, the term of this patent is extended or adjusted under 35 U.S.C. 154(b) by 0 days.

(21) Appl. No.: 09/918,169

(22) Filed: Jul. 30, 2001

(51) Int. Cl.[7] ............................................... B23P 19/04
(52) U.S. Cl. .............................. 29/241; 29/270; 269/6; 269/3
(58) Field of Search .......................... 29/241, 242, 243, 29/268, 267, 270, 278, 280, 272, 263; 269/3, 6; 254/122 R, 134

(56) References Cited

U.S. PATENT DOCUMENTS

| | | | |
|---|---|---|---|
| 1,094,233 A | * 4/1914 | Methvin | 29/241 |
| 2,994,954 A | * 8/1961 | Thompson | 29/241 |
| 3,101,966 A | 8/1963 | Thomas et al. | |
| 3,774,953 A | 11/1973 | Babcock | |
| 4,893,801 A | * 1/1990 | Flinn | 29/241 |
| 4,934,089 A | 6/1990 | Samar | |
| 5,054,829 A | 10/1991 | Olsen | |
| 5,632,519 A | 5/1997 | Stock | |
| 5,713,617 A | 2/1998 | Marinaro | |
| 5,730,033 A | 3/1998 | Mitrowski | |
| 5,742,220 A | 4/1998 | Scherer | |
| 5,943,754 A | * 8/1999 | Plite | 29/268 |

* cited by examiner

Primary Examiner—Lee Wilson
(74) Attorney, Agent, or Firm—Stetina Brunda Garred & Brucker

(57) ABSTRACT

A wire gripper device has upper and lower gripper members. The upper gripper member is movably engaged to the lower gripper member to alternate between closed and open positions. Moreover, the lower gripper member has a lower gripper section. A lower notch is formed on the lower gripper section, wherein the lower notch is sized and configured to support a wire therein. In addition, a biasing member is engaged between the upper and lower gripper members.

27 Claims, 4 Drawing Sheets

WIRE GRIPPER AND METHOD OF INSTALLING DECORATIVE WIRE STRINGS

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention generally relates to a wire gripper device, and more particularly to an improved wire gripper device that is attachable to a pole for facilitating rapid installation/removal of a decorative wire string upon an elevated support surface.

Installation of decorative wire string such as Christmas lights upon elevated surfaces of residential houses and commercial buildings is an annual holiday event.

Typically, installation of such decorative wire string, upon residential houses and commercial buildings, requires the use of a ladder, with the installer manually attaching the string to fasteners previously placed or simultaneously placed on the structure. Additionally, the ladder must be sequentially climbed up and climbed down by the user and be moved horizontally along the length of the structure. Such repetitive up and down and lateral ladder movement is extremely tiring, difficult, and poses a substantial chance of physical injury during climbing or moving the ladder.

Thus, there is a need for a device that allows a user to install decorative wires at elevated locations without the problems associated with the above methodology. More specifically, there is a need to freely exercise lateral movements about the length of the residential houses and commercial buildings when installing decorative wires thereon.

The present invention specifically overcomes the problems associated with the above prior art by providing a wire gripper device that is attachable on a pole for facilitating installation/removal of a decorative wire upon an elevated structure such as adjacent a roof line of a structure. More specifically, the wire gripper device of the present invention is operative to transition between closed and open positions to selectively hold and release the decorative wire. In this respect, not only does the present invention significantly reduce the risk of injuries as stated above, but may also increase user comfort when installing the decorative wire.

BRIEF SUMMARY OF THE INVENTION

In accordance with a preferred embodiment of the present invention, there is provided a wire gripper device ("device"). The device is threadably attachable to a corresponding pole, such as an aluminum telescoping pole, or alternatively attachable via threads to a conventional broom pole. The device comprises a pair of articulating members, namely, upper gripper member and lower gripper member. The lower gripper member is fixed in a stationary position relative to a pole receiving member and pole while upper gripper member may pivot about pivot point which additionally extends through an aperture formed on the lower gripper member. A pair of arcuate notches are formed on the upper and lower members, respectively. A biasing member (e.g., tension spring, rubber bands, etc.) extends between the upper and lower gripper members such that under normal circumstances the upper gripper member is biased tightly downward onto the lower gripper member.

When it is desired to grab a decorative wire, the wire can be manually placed within the lower arcuate notch whereby due to the downward biasing force of the upper gripper member against the lower gripper member, the wire will remain in the lower arcuate notch. Subsequently, the wire may be elevated to a desired location and when in desired position, the user may push the forward end of the upper member into the roof line or the like causing the upper gripper member to pivot upwardly whereby the wire is free to be removed from the lower notch and remain upon a support surface. Of course, the process can be reversed when desired to remove the wire from the support surface.

BRIEF DESCRIPTION OF THE DRAWINGS

These as well as other features of the present invention will become more apparent upon reference to the drawings wherein.

DETAILED DESCRIPTION OF THE INVENTION

Figure 1:
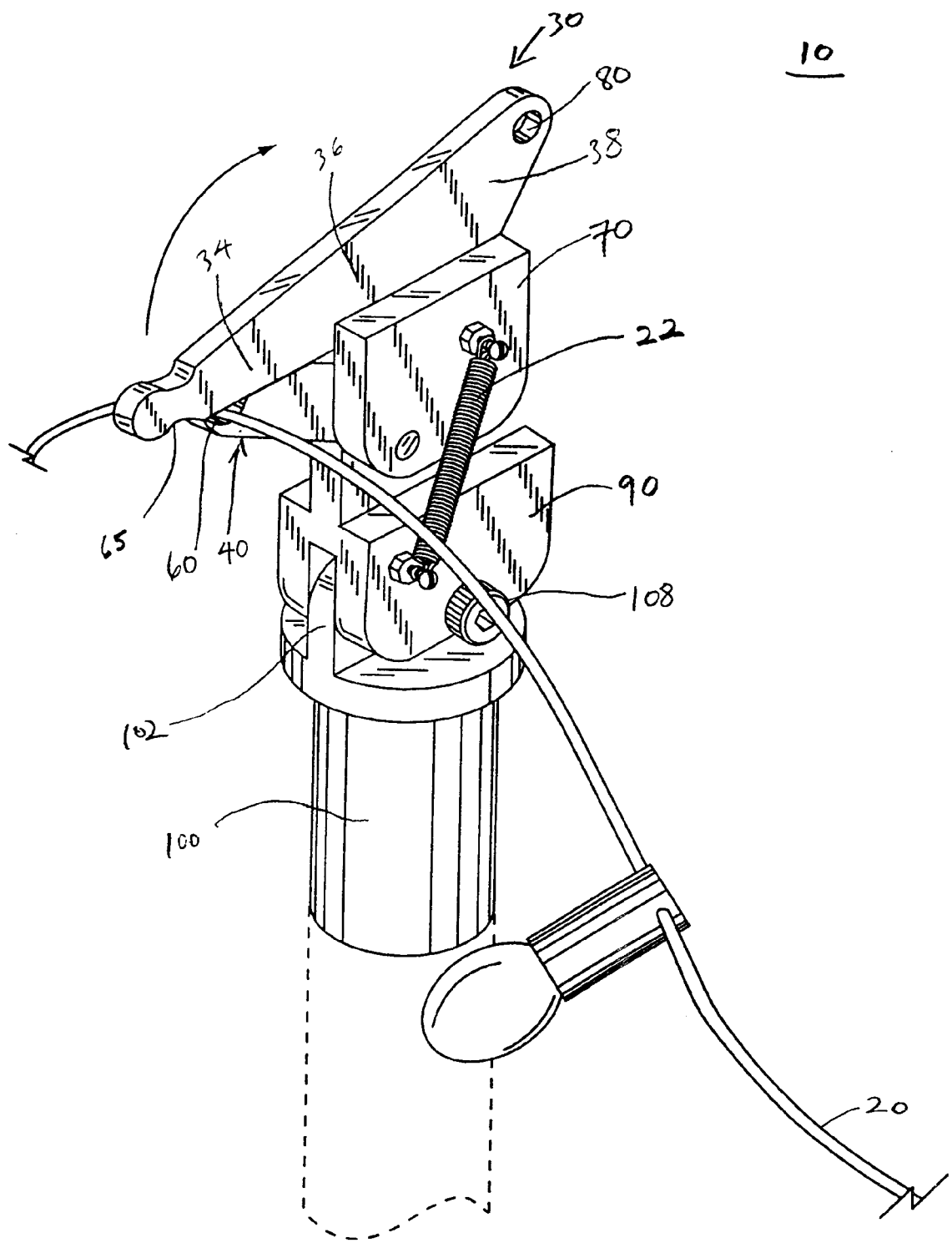
FIG. 1 is a perspective view of a wire gripper device constructed in accordance with a preferred embodiment of the present invention and including a biasing member engaged thereto.

Referring now to the drawings wherein the showings are for purposes of illustrating preferred embodiments of the present invention only, and not for purposes of limiting the same, FIG. 1 perspectively illustrates a wire gripper device 10 ("device") constructed in accordance with a preferred embodiment of the present invention. As indicated above, the device 10 is adapted to facilitate installation of a wire 20 upon an elevated support surface 25 in the manner shown in FIG. 4. Those of ordinary skill in the art will recognize that the device 10 may be formed to have a variety of shapes, configurations, geometries and sizes other than for that shown in FIGS. 1–4.

Referring more particularly to FIG. 1, the device 10 comprises a pair of articulating members, namely, an upper gripper member 30 and a lower gripper member 40. The lower gripper member 40 is fixed in a stationary position relative to a pole receiving member 100 while the upper gripper member 30 is movably engaged to the lower gripper member 40. Specifically, the upper gripper may pivot about a pivot point which additionally extends through a lower gripper member aperture (not shown) formed on the lower gripper member 40. By such engagement, the upper gripper member 30 pivotally alternates between a closed position 50 and an open position 55 with respect to the lower gripper member 40 (best illustrated in FIG. 3). However, one of ordinary skill in the art will easily contemplate the movement of the lower gripper member 40 with respect to the upper gripper member 30, or alternatively, with respect to each other. The formation of closed and open positions 50, 55 by the upper gripper member 30 with respect to the lower gripper member 40 is merely a preferred embodiment of the present invention, and should not be limited thereto. Moreover, the upper and lower gripper members 30, 40 are each preferably fabricated from a plastic material.

Figure 3:
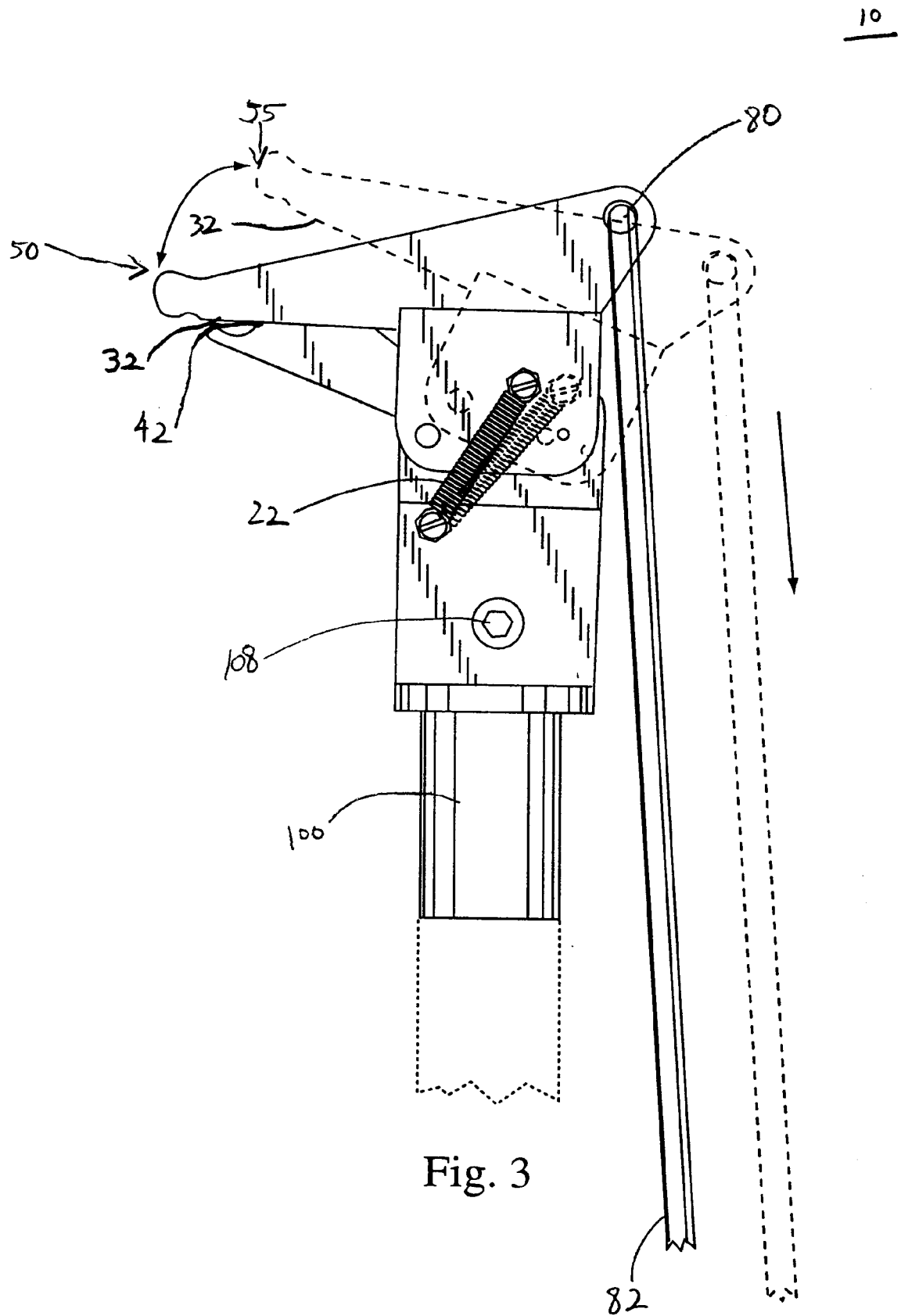
FIG. 3 is a side view of the wire gripper device shown in FIG. 1, further illustrating an upper gripper member alternating between closed and open positions.

Referring now to FIGS. 1 and 3, the lower gripper member 40 has a lower gripper section 42. In addition, the lower gripper member 40 defines a lower distal portion 44, a lower intermediate portion 46 and a lower proximal portion 48. A lower notch 60 is formed on the lower gripper section 42 at the lower distal portion 44. Although the lower notch 60 may have a variety of configurations and shapes, it is preferable that the lower notch 60 be arcuately configured so as to support the wire therein.

Moreover, the upper gripper member 30 has an upper gripper section 32. As stated above, the upper gripper member 30 is biased tightly downward onto the lower gripper member 40 via a biasing member 22 to form the closed position 50 with respect to the lower gripper member 40. When forming the closed position 50, the upper gripper section 32 is in substantially abutting contact with the lower gripper section 42 of the lower gripper member 40. By doing so, the upper gripper member 30 substantially encloses the wire 20 supported in the lower notch 60 of the lower gripper section 42. Furthermore, when forming the open position 55, the upper gripper section 32 may pivot about a pivot point to move away from the lower gripper section 42 so as to be spaced apart therefrom and thus expose the wire 20 supported in the lower notch 60 to the outside environment.

A biasing member 22 is engaged between the upper and lower gripper members 30, 40 to urge the upper gripper member 30 tightly downward onto the lower gripper member 40 so as to form the closed position 50. In other words, the biasing member 22 applies sufficient force upon the device 10 such that the upper gripper member reflexes back to the closed position 50. In the preferred embodiment of the present invention, the biasing member 22 is a tension spring. However, one of ordinary skill in the art will contemplate that any piece that is operative to provide biasing force may substitute the tension spring, such as a rubber band for example.

Figure 4:
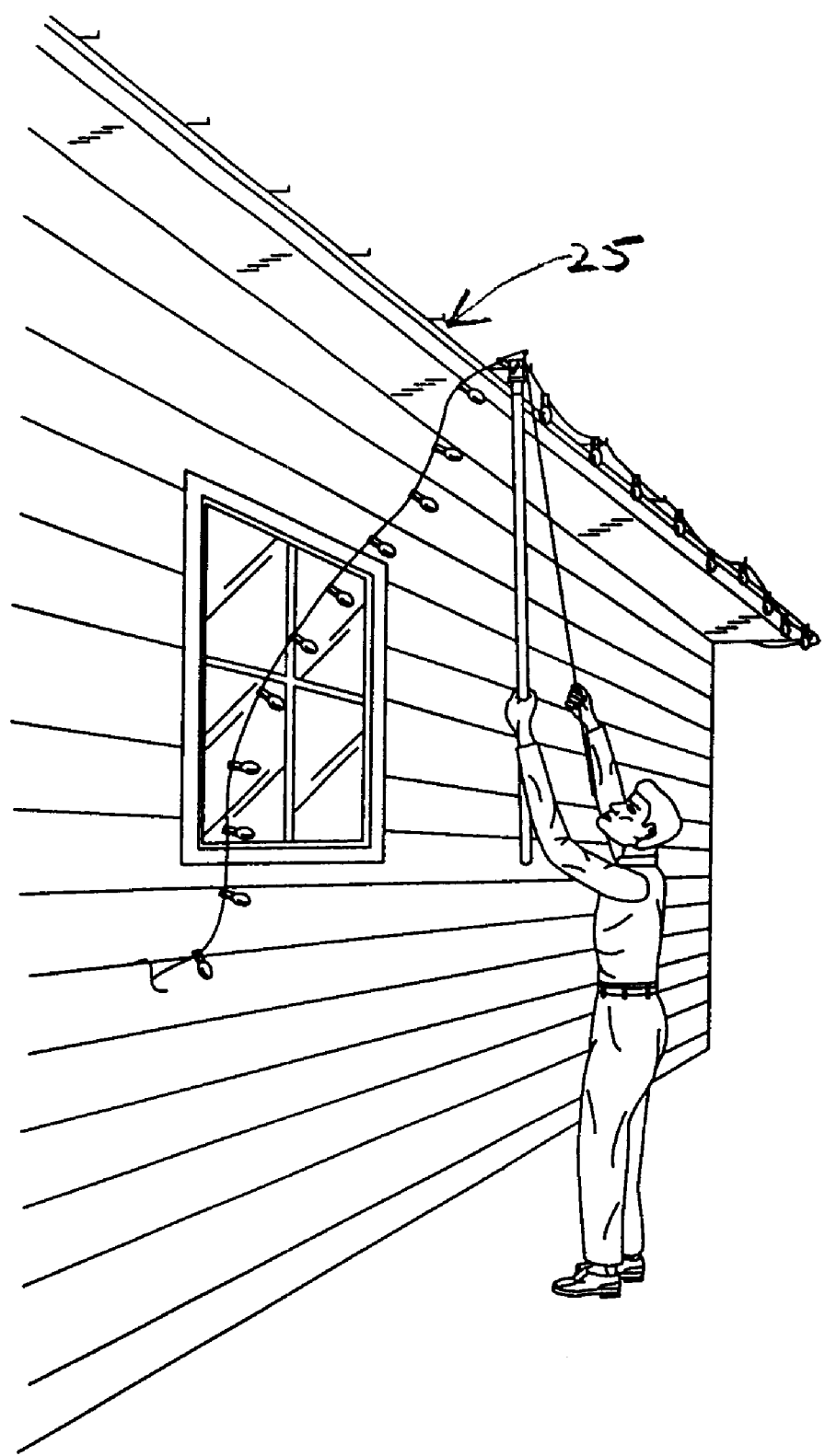
FIG. 4 is a perspective view of the wire gripper device shown in FIG. 1 as applied to an exemplary elevated support surface.

Referring more particularly to FIGS. 1, 3 and 4, the upper gripper member 30 is defined by an upper distal portion 34, an upper intermediate portion 36 and an upper proximal portion 38. The upper proximal portion 38 may form, but does not have to, an upper aperture 80 penetrating therethrough. Moreover, the upper gripper member 30 comprises an upper notch 65 formed on the upper gripper section 32 at the upper distal portion 34. As seen in the Figures, the upper distal portion 34 protrudes farther out than the lower distal portion 44. Simply put, the upper distal portion 34 is slightly longer than the lower distal portion 44 such that a little bit of the upper gripper section 32 is exposed to the outside environment thereat. The upper notch 65 should be formed at such exposed upper gripper section 32. The upper notch 65 may be characterized by any variety of configurations and shapes. However, it is preferable that the upper notch 65 is arcuately configured.

Moreover, the upper gripper member 30 further has two opposing upper sides 39. Furthermore, the upper gripper member 30 comprises an upper receiving member 70 that extends generally between the upper intermediate portion 36 and the upper proximal portion 38 and is further formed adjacent the upper gripper section 32. The upper receiving member 70 is comprised of a first upper flange 72 and a second upper flange 74. In particular, the first and second upper flanges 72, 74 are formed on respective ones of the opposing upper sides 39 to extend downward therefrom toward the lower gripper member 40.

The lower intermediate portion 46 and the lower proximal portion 48 are positioned between the first and second upper flanges 72, 74 to pivotally engage the flanges 72, 74. Such pivotal engagement may be accomplished by any known applications, such as a pivot pin for example. However, in the preferred embodiment, the lower gripper member 40 forms an elongated lower gripper member aperture (not shown) that generally extends laterally between the lower intermediate and proximal portions 46, 48. By having such an elongated aperture, the lower gripper member 40 may simply engage the first and second upper flanges 72, 74 which may be urged in relative positions as seen in FIGS. 1–3 by the biasing member 22.

The lower gripper member 40 comprises a lower receiving member 90. Moreover, the lower gripper member 30 defines two opposing lower sides 49. In particular, the lower receiving member 90 extends generally between the lower intermediate and proximal portions 46, 48. More specifically, the lower receiving member 90 is comprised of a first lower flange 92 and a second lower flange 94. The first and second lower flanges 92, 94 are formed on respective ones of the opposing lower sides 49 to extend downward therefrom toward a pole receiving member 100.

Figure 2:
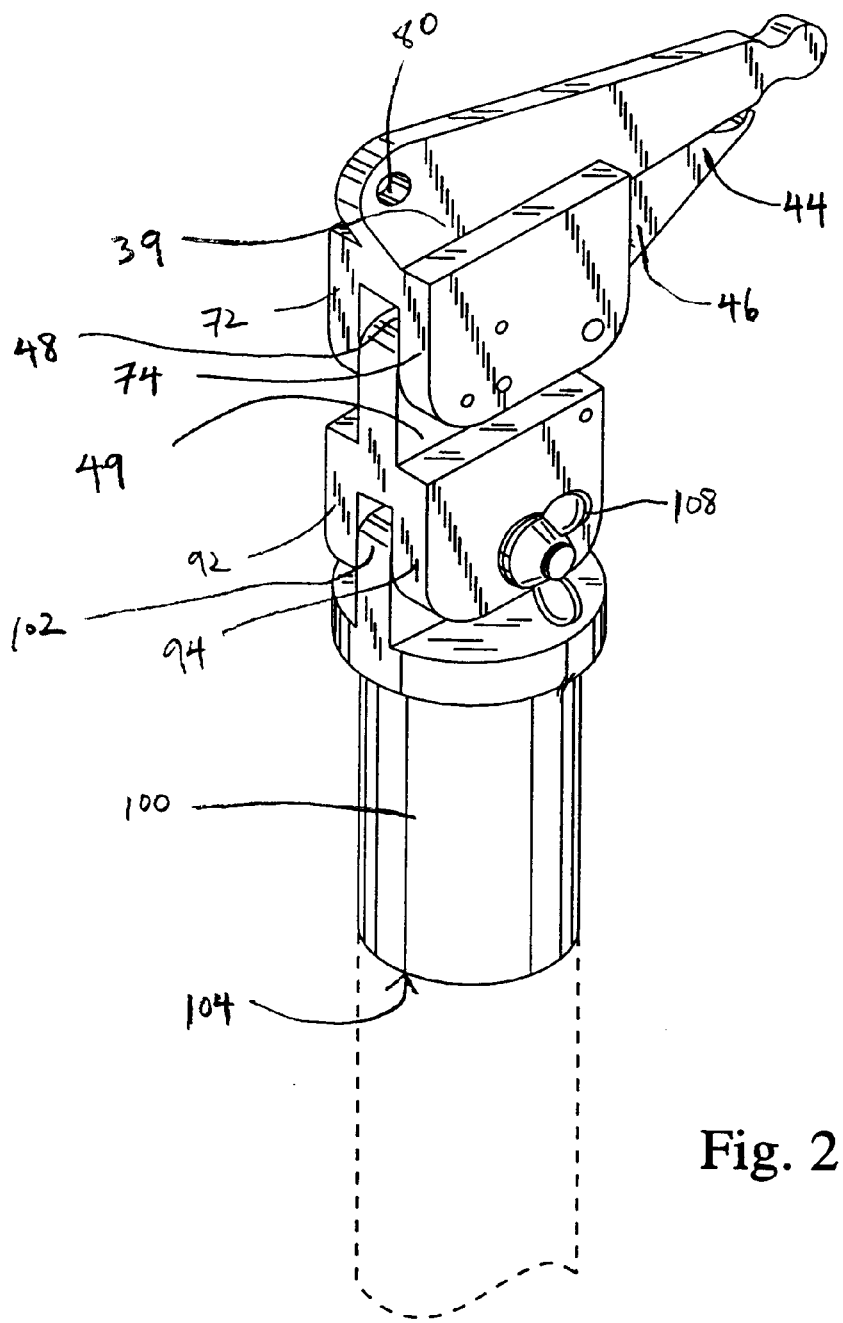
FIG. 2 is a perspective view of the wire gripper device shown in FIG. 1, further illustrating a connecting member engaged thereto.

Referring now to FIG. 2, the pole receiving member 100 defines a pole appendage 102 which positions itself between the first and second lower flanges 92, 94 to be engaged thereat. Moreover, the pole appendage 102 may be, but does not have to be, pivotally engaged to the first and second lower flanges 92, 94. Such pivotal engagement may be accomplished by any known means (e.g., a pivot pin). However, in the preferred embodiment of the present invention, a connecting assembly 108 may be utilized for such purpose.

In particular, the connecting assembly 108 is sized and configured to pivotally and movably engage the pole appendage 102 with respect to the first and second lower flanges 92, 94. By doing so, the upper and lower gripper members 30, 40 may form different angular orientations/positions in relation to the pole appendage 102. For example, the connecting assembly 108 may be comprised of a wing nut, a screw, and a nut. The screw may be inserted from one of the lower sides 49 to extend to the other lower side 49 such that a wing nut and a nut may be respectively engaged at two ends of the screw. Moreover, the wing nut may be tightened or loosened to facilitate the movement of the pole appendage 102 with respect to the first and second lower flanges 92, 94. Additionally, the pole receiving member 100 defines a pole opening 104 on the end that is opposite to the pole appendage 102 which is sized and configured to receive a pole therein.

As will be recognized, the pole is inserted into to pole opening 104 so as to access the device 10 upon the elevated support surface 25. Because the inside of the pole opening 104 may be threaded, the pole may be a corresponding aluminum telescoping pole (e.g., a paint pole) for a threaded engagement thereto. Or in the alternative, the device 10 may simply be attached via threads to a conventional broom pole to perform the same. Thereafter, the wire 20 can be manually placed within the lower notch 60 whereby due to the downward biasing force of the upper gripper member 30 against the lower gripper member 40, the wire will remain in the lower arcuate notch 60. Subsequently, the wire 20 may be elevated to a desired support surface 25 such that the, user may apply a horizontal force to push the forward end of the upper gripper member 30 into the roof line or the like causing the upper gripper member 30 to pivot upwardly whereby the wire 20 is free to be removed from the lower notch 60 and remain upon the support surface 25.

In order to facilitate the pivotal movement the upper gripper member 30 to the open position 55, a rope 82 may be engaged through the upper aperture 80. A user may simply pull on the rope 82 to pivotally move the upper gripper member 30 into an open position 55 with respect to the lower gripper member 40. In addition, it will be appreciated by one of ordinary skill in the art that the rope 82 may be substituted by a string or any elongated piece. In addition to applying horizontal force to push the front distal end of the upper gripper member 30, the upper notch 65 may be engageable upon the elevated support surface 25 to facilitate in forming the open position 55. The user may simply apply sufficient downward force when the upper notch 65 engages the elevated contact surface 25 to form the open position 55. By forming the open position 55 at the support surface 25, whether via the horizontal or downward force, the wire 20 may be released from the lower notch 60 so as to be placed upon the contact surface 25. Of course, the process can be reversed when desired to remove the wire 20 from the elevated support surface 25.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A wire gripper device comprising:
   upper and lower gripper members, the upper gripper members having an upper proximal portion and being movably engaged to the lower gripper member to alternate between closed and open positions, the upper proximal portion having an upper aperture for engaging a rope therethrough to facilitate in forming the open position, the lower gripper member having a lower gripper section;
   a lower notch formed on the lower gripper section, the lower notch being sized and configured to support a wire therein; and
   a biasing member engaged between the upper and lower gripper members;
   wherein the upper gripper member forms the closed position with respect to the lower gripper member to substantially enclose the wire supported in the lower notch thereby, the upper gripper member further forming the open position with respect to the lower gripper member to expose the wire supported in the lower notch thereby.

2. The device of claim 1 wherein the upper and lower gripper members are each fabricated from a plastic material.

3. The device of claim 1 wherein the upper gripper member has an upper gripper section, the upper gripper section being in substantially abutting contact with the lower gripper section when forming the closed position, the upper gripper section being spaced apart from the lower gripper section when forming the open position.

4. The device of claim 1 wherein the upper gripper member has an upper gripper section and an upper receiving member, the upper gripper member further having an upper intermediate portion and an upper proximal portion, the upper receiving member extending generally between the upper intermediate portion and the upper proximal portion adjacent the upper gripper section.

5. The device of claim 4 wherein the upper gripper member has two opposing upper sides, and wherein the upper receiving member comprises first and second upper flanges, the first and second upper flanges being formed on respective ones of the opposing upper sides to extend downward therefrom.

6. The device of claim 5 wherein the lower gripper member has a lower intermediate portion and a lower proximal portion, the lower intermediate portion and the lower proximal portion being positioned between the first and second upper flanges to be engaged thereat.

7. The device of claim 6 wherein the first and second upper flanges are pivotally movable with respect to the lower proximal portion.

8. The device of claim 1 wherein a horizontal force is applicable to push the upper gripper member against a contact surface to facilitate in forming the open position so as to release the wire upon the contact surface.

9. The device of claim 1 wherein the upper gripper member has an upper notch and an upper gripper section, the upper notch being formed on the upper gripper section, a downward force being applicable when the upper notch is engaged upon a contact surface to facilitate in forming the open position so as to release the wire upon the contact surface.

10. The device of claim 9 wherein the upper notch is arcuately configured.

11. The device of claim 1 wherein the lower notch is arcuately configured.

12. The device of claim 1 wherein the lower gripper member has a lower distal portion, the lower notch being formed at the lower distal portion.

13. The device of claim 1 wherein the lower gripper member has a lower receiving member, the lower gripper member further having a lower intermediate portion and a lower proximal portion, the lower receiving member extending generally between the lower intermediate portion and the lower proximal portion.

14. The device of claim 13 wherein the lower gripper member has two opposing lower sides, and wherein the lower receiving member comprises first and second lower flanges, the first and second lower flanges being formed on respective ones of the opposing lower sides to extend downward therefrom.

15. The device of claim 14 further comprising a pole receiving member having a pole appendage, the pole appendage being positioned between the first and second lower flanges to be engaged thereat.

16. The device of claim 15 wherein the pole appendage is pivotally engaged to the first and second lower flanges.

17. The device of claim 15 further comprising a connecting member, the connecting member being sized and configured to movably engage the pole appendage with the first and second lower flanges.

18. The device of claim 15 wherein the pole receiving member defines a pole opening opposite the pole appendage, the pole opening being sized and configured to receive a pole therein.

19. The device of claim 1 wherein the biasing member is a tension spring, the tension spring being operative to urge the upper gripper member towards the lower gripper member so as to form the closed position.

20. A wire gripper device comprising:
   upper and lower gripper members, the upper gripper member being movably engaged to the lower gripper member to alternate between closed and open positions, the upper gripper member having an upper gripper section, an upper receiving member with first and second upper flanges, an upper intermediate portion, an upper proximal portion and two opposing upper sides, the upper receiving member extending generally between the upper intermediate portion and the upper proximal portion adjacent the upper gripper section, the first and second upper flanges being formed on respective ones of the opposing upper sides to extend downward therefrom, the lower gripper member having a lower gripper section;

a lower notch formed on the lower gripper section, the lower notch being sized and configured to support a wire therein;

a biasing member engaged between the upper and lower gripper members; and wherein the upper gripper member forms the closed position with respect to the lower gripper member to substantially enclose the wire supported in the lower notch thereby, the upper gripper member further forming the open position with respect to the lower gripper member to expose the wire supported in the lower notch thereby.

21. The device of claim 20 wherein the lower gripper member has a lower intermediate portion and a lower proximal portion, the lower intermediate portion and the lower proximal portion being positioned between the first and second upper flanges to be engaged thereat.

22. The device of claim 21 wherein the first and second upper flanges are pivotally movable with respect to the lower proximal portion.

23. A wire gripper device comprising:

upper and lower gripper members, the upper gripper member being movably engaged to the lower gripper member to alternate between closed and open positions, the lower gripper member having a lower gripper section, a lower receiving member with first and second lower flanges, a lower intermediate portion, a lower proximal portion and two opposing lower sides, the lower receiving member extending generally between the lower intermediate portion and the lower proximal portion, the first and second lower flanges being formed on respective ones of the opposing lower sides to extend downward therefrom;

a lower notch formed on the lower gripper section, the lower notch being sized and configured to support a wire therein;

a biasing member engaged between the upper and lower gripper members; and wherein the upper gripper member forms the closed position with respect to the lower gripper member to substantially enclose the wire supported in the lower notch thereby, the upper gripper member further forming the open position with respect to the lower gripper member to expose the wire supported in the lower notch thereby.

24. The device of claim 23 further comprising a pole receiving member having a pole appendage, the pole appendage being positioned between the first and second lower flanges to be engaged thereat.

25. The device of claim 24 wherein the pole appendage is pivotally engaged to the first and second lower flanges.

26. The device of claim 24 further comprising a connecting member, the connecting member being sized and configured to movably engage the pole appendage with the first and second lower flanges.

27. The device of claim 24 wherein the pole receiving member defines a pole opening opposite the pole appendage, the pole opening being sized and configured to receive a pole therein.

* * * * *